United States Patent
Bendall et al.

(10) Patent No.: US 6,422,451 B2
(45) Date of Patent: Jul. 23, 2002

(54) INTERCONNECTION OF ALUMINUM COMPONENTS

(75) Inventors: Peter Neil Roy Bendall; Steve Robert Williams, both of Crewe (GB)

(73) Assignee: GEA Spiro-Gills Ltd., Stafford (GB)

( * ) Notice: Subject to any disclaimer, the term of this patent is extended or adjusted under 35 U.S.C. 154(b) by 0 days.

(21) Appl. No.: 09/808,698

(22) Filed: Mar. 14, 2001

(30) Foreign Application Priority Data

Mar. 22, 2000 (GB) ............................................... 0006773

(51) Int. Cl.⁷ .................. B23K 31/02; B23K 35/36; B23K 35/38

(52) U.S. Cl. .................. 228/199; 228/183; 228/219; 228/224

(58) Field of Search ................... 228/224, 183, 228/214, 218, 219, 199

(56) References Cited

U.S. PATENT DOCUMENTS

| | | | |
|---|---|---|---|
| 3,945,899 A | | 3/1976 | Nikaido et al. |
| 3,963,568 A | | 6/1976 | Nikaido et al. |
| 4,421,789 A | | 12/1983 | Kaneko et al. |
| 4,531,979 A | * | 7/1985 | Bohler et al. |
| 4,723,597 A | | 2/1988 | Sonoda |
| 4,759,805 A | * | 7/1988 | Saruwatari et al. |
| 4,878,963 A | | 11/1989 | Bibber |
| 4,962,880 A | * | 10/1990 | Iwai et al. |
| 4,986,897 A | * | 1/1991 | Chin |
| 5,055,019 A | * | 10/1991 | Meyer et al. |
| 5,148,862 A | * | 9/1992 | Hashiura et al. |
| 5,333,776 A | * | 8/1994 | Garg et al. |
| 5,362,335 A | * | 11/1994 | Rungta |
| 5,520,768 A | * | 5/1996 | Crook et al. |
| 5,569,325 A | * | 10/1996 | Barclay et al. |
| 5,692,300 A | | 12/1997 | Conn et al. |
| 6,068,711 A | * | 5/2000 | Lu et al. |
| 6,178,630 B1 | * | 1/2001 | Jimarez et al. |
| 6,261,706 B1 | * | 7/2001 | Fukuda et al. |

FOREIGN PATENT DOCUMENTS

| | | | |
|---|---|---|---|
| DE | 198 46 346 | | 3/2000 |
| EP | 03165967 | | 7/1991 |
| GB | 2360477 A | * | 9/2001 |
| JP | 560000280 | | 1/1981 |
| JP | 100130862 | | 5/1998 |

OTHER PUBLICATIONS

US 2001/0023889 A1 Bendall et al. (Sep. 27, 2001).*

* cited by examiner

*Primary Examiner*—Tom Dunn
*Assistant Examiner*—Kiley Stoner
(74) *Attorney, Agent, or Firm*—Smith-Hill and Bedell

(57) ABSTRACT

A method of interconnecting components (10, 16) of aluminium having a purity of at least 95%, the method comprising brazing the components (10, 16) together and then surface treating the assembled componetns (10, 16) by subjecting them to a Bohmitting procedure.

14 Claims, 1 Drawing Sheet

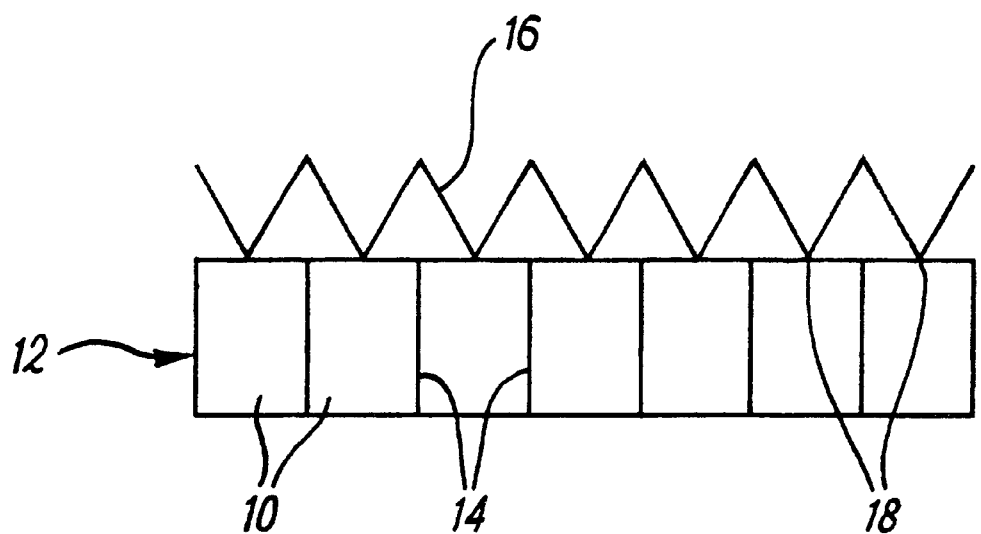

INTERCONNECTION OF ALUMINUM COMPONENTS

The present invention concerns the interconnection of aluminum components, especially but not exclusively the interconnection of aluminum components of heat exchangers by brazing.

It is well known to provide heat exchangers and radiators by interconnecting conduits for primary heat exchange fluid and providing means for circulating secondary heat exchange fluid over the conduits, the external surface area of which is often extended by fixing fins thereto. The fins are normally attached to the conduits by brazing. The conduits and cooling fins are manufactured from aluminum and the brazing process involves joining one to the other with a brazing alloy (Al—Si). The alloy's melting point is lower than that of the component being joined so that when heat is applied to the joint area it melts, but not the component. A metallurgical bond is thus formed between the components. Normal brazing processes are carried out in:

a) a vacuum atmosphere without flux;
b) a molten salt bath with coating;
c) a protective gas atmosphere with coating and with flux;
d) air with coating and with flux.

The process is often assisted by coating one, other or both of the aluminum components being brazed together with a AlSi 8–12 or additional brazing material e.g. strips, bars or powder.

According to the present invention there is provided a method of interconnecting components of aluminum having a purity of at least 95% comprising brazing the components together and thereafter surface treating assembled components by subjecting them to a Boehmitting procedure.

Preferably the components are brazed together in a dry oxygen containing atmosphere in the presence of the suitable flux or paste.

Preferably at least one component is extruded.

Preferably the atmosphere in which the brazing is carried out is ambient air.

Preferably the brazing flux is an insoluble flux consisting of potassium tetrafluoraluminate with solid foils or particles of aluminum silicate ($AlSi_{10}$) powder, or coated core material.

Preferably the brazing paste includes potassium tetrafluoraluminate with a constituent creating a thixotrophic characteristic and aluminum silicate (AlSi) powder.

Preferably the components allow a brazing temperature in the range 590°–625° C. simultaneously and remain at this temperature for substantially six minutes.

Preferably the Boehmitting procedure comprises subjecting the components to deionized water at a temperature of about 100° C.

Alternatively the Boehmitting procedure comprises subjecting the components to wet steam at a temperature of about 150° C.

Preferably the assembled components are further surface treated by a solution of silicate of sodium ($Na_2SiO_4$) in water at about 90–100° C.

Alternatively the assembled components are further surface treated by:

a) subjecting them to 10% boracic acid at about 80–100° C. mixed with water or;
b) subjecting them to 5–10% borax at about 80–100° C. mixed with water or;
c) subjecting them to waterglass ($Na_2SiO_4$) at about 90–100° C. mixed with water or;
d) subjecting them to a low viscosity resin coating.

Preferably the Boehmitting procedure is carried out only on the material surface of the conduit.

BRIEF DESCRIPTION OF THE DRAWINGS

The drawing shows a heat exchanger or radiator manufactured in accordance with the method of the present invention.

An embodiment of the present invention will now be described by way of example only with reference to the accompanying drawing.

A heat exchanger or radiator comprises a plurality of conduits 10 formed in a closed rectangular box section member 12 sub-divided to provide the side by side conduits by partitions 14 extruded integrally with the box section member 12. The member is extruded from 3003 grade aluminum. The extrusion process resulting in a member whose surfaces are generally clean and free from grease. An example of a heat exchanger of this general type is shown in DE19846346.

The external heat exchange surface of the box section member 10 has its area extended by fixing corrugated fins 16 thereto, the fins being made from 3003 grade aluminum coated with a suitable coating (AlSi 8–12) and attached to the outer surface of the box section member 10 at the roots 18 of the corrugations by a continuous automated brazing process which does not form part of the present invention and consequently will not be described here in detail. The brazing is carried out in air utilizing a flux comprising potassium tetrafluoraluminate.

By utilizing this brazing technique it is not necessary to provide a surrounding inert atmosphere or vacuum, or molten salt bath in which the brazing is carried out so that the capital cost of the brazing equipment can be considerably reduced and the brazed components will exhibit an enhanced resistance to corrosion due to the surface coating formed during the brazing process.

The brazing process in the presence of air results in an increase in the thickness of the oxide layer of the 3003 grade aluminum which increases its resistance to corrosion in the working environment.

It has been found that there is at least a perceived reluctance to utilize aluminum heat exchangers (as an alternative to, say, copper or brass heat exchangers) in view of alleged corrosion problems and consequently product approval is more likely to be achieved if the resistance to corrosion of the heat exchange surfaces can be increased. Increased corrosion resistance by chemical oxidization such as chromatizing, anodizing, painting with epoxy resin, galvanizing with various metals, anodic or cathodic protection using existing, known techniques has proved to be impractical due to the failure of the process to provide efficient protection within long tubular members, for example heat exchanger conduits.

In the present embodiment the assembled components of the heat exchanger are subjected to a further surface heat treatment which involves elevating the temperature of the assembled components to Isoac and subjecting the assembly to a water vapor enriched atmosphere.

It can be shown that by using this process the resistance to corrosion of the surface of the assembled heat exchanger components is significantly increased due to the approximately 80-fold increase in the thickness of oxide/boehmit layer compared to other brazing methods.

Various modifications can be made without departing from the scope of the invention. For example the brazing process of the present invention can be utilized to interconnect separate heat exchange primary fluid conduits, the connection being made in side by side, intersecting or any other relationship.

The brazing flux may be substituted by a brazing paste for example, a paste including potassium tetrafluoraluminate with a constituent creating a thixotrophic characteristic and aluminum silicate (AlSi) powder.

The brazing techniques may be modified to those involving an inert or vacuum atmosphere, or a molten salt bath technique.

The Boehmitting process may be modified. It may involve subjecting the area to be treated to deionized water at a temperature of about 100° C.

Other modified and known Boehmitting procedures can be carried out.

In a further modification the Boehmitting process is carried out only to the internal surfaces of the conduit.

In another modification the surface treatment can be enhanced by subjecting the assembled components to a silicate of sodium/water wash.

Alternatively the assembled components are further surface treated by:
  a) subjecting them to 10% boracic acid at about 80–100° C. mixed with water or;
  b) subjecting them to 5–10% borax at about 80–100° C. mixed with water or;
  c) subjecting them to waterglass ($Na_2SiO_4$) at about 90–100° C. mixed with water or;
  d) subjecting them to a low viscosity resin coating.

Preferably the Boehmitting procedure is carried out only on the material surface of the conduit.

The use of extruded material for the conduit means that normal cleaning process carried out prior to Boehmitting is unnecessary. The could involve degreasing, water flushing, pickling, further water flushing, neutralizing and further flushing.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of interconnecting components of aluminum having a purity of at least 95% comprising brazing the components together in an oxygen containing atmosphere and thereafter surface treating assembled components by subjecting them to a Boehmitting procedure.

2. A method as claimed in claim 1, in which the components are brazed together in a dry oxygen containing atmosphere in the presence of a suitable flux or paste.

3. A method as claimed in claim 1, in which at least one component is extruded.

4. A method as claimed in claim 1, in which the atmosphere in which the brazing is carried out is ambient air.

5. A method as claimed in claim 1, in which the components are brazed together in the presence of an insoluble brazing flux consisting of potassium tetrafluoraluminate with solid foils or particles of aluminum silicate powder, or coated core material.

6. A method as claimed in claim 5, comprising brazing the components together in an atmosphere of ambient air.

7. A method as claimed in claim 1, in which the components are brazed together in the presence of a brazing paste including potassium tetrafluoraluminate with a constituent creating a thixotrophic characteristic and aluminum silicate powder.

8. A method as claimed in claim 7, comprising brazing the components together in an atmosphere of ambient air.

9. A method as claimed in claim 1, in which the components allow a brazing temperature in the range 590°–625° C. simultaneously and remain at this temperature for substantially six minutes.

10. A method as claimed in claim 1, in which the Bohmitting procedure comprises subjecting the components to deionized water at a temperature of about 100° C.

11. A method as claimed in claim 1, in which the Bohmitting procedure comprises subjecting the components to wet steam at a temperature of about 150° C.

12. A method as claimed in claim 1, in which the assembled components are further surface treated by a solution of silicate of, sodium ($Na_2SiO_4$) in water at about 90°–100° C.

13. A method as claimed in claim 1, in which the assembled components are further surface treated by:
  a) subjecting them to 10% boracic acid at about 80°–100° C. mixed with water or;
  b) subjecting them to 5–10% borax at about 80–100° C. mixed with water or;
  c) subjecting them to waterglass ($Na_2SiO_4$) at about 90°–100° C. mixed with water or;
  d) subjecting them.to a low viscosity resin coating.

14. A method as claimed in claim 1, in which the Boehmitting procedure is carried out only on the material surface of the conduit.

* * * * *